US008882493B2

(12) United States Patent
Vandergriendt et al.

(10) Patent No.: US 8,882,493 B2
(45) Date of Patent: Nov. 11, 2014

(54) CONTROL OF SYNGAS TEMPERATURE USING A BOOSTER BURNER

(75) Inventors: Hendrick Vandergriendt, Surrey (CA); Duncan Meade, Vancouver (CA); Yan Li, Vancouver (CA); Nebojsa Plavsic, Vancouver (CA)

(73) Assignee: Nexterra Systems Corp., Vancouver, CA (US)

( * ) Notice: Subject to any disclaimer, the term of this patent is extended or adjusted under 35 U.S.C. 154(b) by 0 days.

(21) Appl. No.: 14/005,527

(22) PCT Filed: Mar. 17, 2011

(86) PCT No.: PCT/CA2011/050147
§ 371 (c)(1),
(2), (4) Date: Sep. 16, 2013

(87) PCT Pub. No.: WO2012/122622
PCT Pub. Date: Sep. 20, 2012

(65) Prior Publication Data
US 2014/0004471 A1    Jan. 2, 2014

(51) Int. Cl.
*F23D 11/44*    (2006.01)
*F23K 1/04*    (2006.01)
(Continued)

(52) U.S. Cl.
CPC ......... *F23G 5/14* (2013.01); *F23C 2900/99011* (2013.01); *F23K 1/04* (2013.01); *F23D 23/00* (2013.01); *C10J 2300/0916* (2013.01); *C10J 3/30* (2013.01); *C04B 7/4407* (2013.01); *C10J 2300/0956* (2013.01); *F23K 2401/10* (2013.01); *C10J 3/20* (2013.01); *F23G 5/027* (2013.01); *F23K 5/007* (2013.01); *F23N 1/02* (2013.01); *F23K 2201/20* (2013.01); *C10J 2300/0909* (2013.01)
USPC ............... 431/12; 431/175; 431/278; 431/11; 431/6; 110/234; 110/190

(58) Field of Classification Search
CPC ......... F23G 5/14; F23G 5/027; F23G 5/0276; F23G 5/16; F23G 5/165; F23G 22/103; C10J 3/007; C10J 3/005; C10J 3/002; C10J 2300/12; C10J 2300/1223; C10J 1/027; C10J 1/02; C10J 3/86; C10J 3/02; C10J 2300/1606; F22B 31/045; F23B 90/06; F23C 6/04; F23C 1/00; F23D 11/446; F23D 14/60; F23D 17/00; F23D 2204/00
USPC ............. 431/112, 175, 278, 11, 6, 89, 90, 37, 431/236, 5; 110/234, 229, 187, 231, 190
IPC .................... C10J 3/02, 3/48, 3/82; F23D 11/44
See application file for complete search history.

(56) References Cited

U.S. PATENT DOCUMENTS 1,692,476 A    11/1928    Wadsworth
2,658,349 A *  11/1953    Keller .............................. 60/682
(Continued)

FOREIGN PATENT DOCUMENTS

CA    1308910    10/1992
CA    2255218    6/1999
(Continued)

OTHER PUBLICATIONS

Mackie, D. et al., "Gasification of Bark—A New Opportunity to Reduce Fossil Fuel in Power Boilers and Lime Kilns", TAPPI Engineering, Pulping & Environmental Conference, Aug. 24-27, 2008, Portland, Oregon, http://www.tappi.org/Downloads/Conference-Papers/2008/08EPE/08epe50.apx.

(Continued)

*Primary Examiner* — Kang Hu
*Assistant Examiner* — Daniel E Namay
(74) *Attorney, Agent, or Firm* — Oyen Wiggs Green & Mutala LLP (57) ABSTRACT

A method and system for fueling of a burner in a direct-fired device using syngas. A gasifier produces syngas from a carbonaceous feedstock such as biomass. The syngas is fed to a syngas burner. A booster burner disposed between the gasifier and the syngas burner increases the temperature of the syngas. The booster burner may be provided with an approximately stoichiometric or sub-stoichiometric amount of oxidant. Operation of the booster burner may be regulated based on the temperature of the syngas. The syngas burner may be used to direct-fire a device requiring a relatively high flame temperature, such as, for example, a lime kiln.

43 Claims, 3 Drawing Sheets

(51) Int. Cl.

| | |
|---|---|
| *F23D 23/00* | (2006.01) |
| *C10J 3/30* | (2006.01) |
| *C04B 7/44* | (2006.01) |
| *C10J 3/20* | (2006.01) |
| *F23G 5/027* | (2006.01) |
| *F23K 5/00* | (2006.01) |
| *F23N 1/02* | (2006.01) |
| *F23G 5/14* | (2006.01) |
| *C10J 3/02* | (2006.01) |
| *C10J 3/48* | (2006.01) |

(56) References Cited

U.S. PATENT DOCUMENTS

| | | | | |
|---|---|---|---|---|
| 3,959,972 | A | * | 6/1976 | Rudolph et al. ............... 60/651 |
| 4,381,187 | A | | 4/1983 | Sederquist |
| 4,809,624 | A | * | 3/1989 | Van Der Burgt ............ 110/347 |
| 4,909,727 | A | | 3/1990 | Khinkis |
| 4,941,415 | A | | 7/1990 | Pope et al. |
| 4,958,578 | A | * | 9/1990 | Houser ......................... 110/246 |
| 4,986,199 | A | * | 1/1991 | Komeno et al. ............. 110/347 |
| 4,987,115 | A | | 1/1991 | Michel-Kim |
| 5,145,491 | A | * | 9/1992 | Schmitt et al. ............. 48/197 R |
| 5,425,792 | A | * | 6/1995 | Bishop et al. ............. 48/197 R |
| 5,656,044 | A | * | 8/1997 | Bishop et al. ............. 48/197 R |
| 5,733,941 | A | * | 3/1998 | Waycuilis ..................... 518/703 |
| 5,851,246 | A | * | 12/1998 | Bishop et al. .................. 48/122 |
| 6,084,139 | A | * | 7/2000 | Van Der Giessen et al. . 585/240 |
| 6,120,567 | A | | 9/2000 | Cordell et al. |
| 6,381,963 | B1 | | 5/2002 | Graham |
| 6,485,296 | B1 | | 11/2002 | Bender et al. |
| 6,506,510 | B1 | | 1/2003 | Sioui et al. |
| 6,694,900 | B2 | * | 2/2004 | Lissianski et al. ............ 110/345 |
| 6,911,058 | B2 | * | 6/2005 | Calderon et al. ............ 48/197 R |
| 7,789,026 | B2 | * | 9/2010 | Traina ............................ 110/341 |
| 7,793,601 | B2 | * | 9/2010 | Davison et al. ............... 110/229 |
| 8,001,912 | B2 | * | 8/2011 | Graham ........................ 110/342 |
| 8,100,992 | B2 | * | 1/2012 | Sakai et al. ......................... 48/61 |
| 8,237,006 | B2 | * | 8/2012 | Stone et al. .................... 588/321 |
| 8,317,886 | B2 | * | 11/2012 | Graham et al. ................ 48/101 |
| 8,459,985 | B2 | * | 6/2013 | Carroni et al. ..................... 431/9 |
| 8,578,869 | B2 | * | 11/2013 | Meng ............................ 110/229 |
| 8,591,737 | B2 | * | 11/2013 | Kukkonen et al. ............ 210/260 |
| 2003/0005634 | A1 | * | 1/2003 | Calderon et al. ................ 48/210 |
| 2003/0110994 | A1 | * | 6/2003 | Lissianski et al. ............ 110/345 |
| 2004/0107638 | A1 | | 6/2004 | Graham et al. |
| 2004/0261670 | A1 | * | 12/2004 | Dueck et al. .................. 110/231 |
| 2007/0266914 | A1 | * | 11/2007 | Graham et al. ............... 110/229 |
| 2007/0284453 | A1 | | 12/2007 | Tsangaris et al. |
| 2007/0289216 | A1 | * | 12/2007 | Tsangaris et al. ........... 48/197 R |
| 2008/0244976 | A1 | | 10/2008 | Paisley |
| 2008/0277265 | A1 | | 11/2008 | Tsangaris et al. |
| 2009/0221866 | A1 | * | 9/2009 | Stone et al. .................... 588/321 |
| 2010/0035193 | A1 | * | 2/2010 | Davis et al. ........................ 431/2 |
| 2010/0156104 | A1 | * | 6/2010 | Bottinelli ........................ 290/52 |
| 2010/0162711 | A1 | * | 7/2010 | Zuo et al. ......................... 60/742 |
| 2010/0317749 | A1 | * | 12/2010 | Kukkonen et al. ............ 518/702 |
| 2011/0036014 | A1 | * | 2/2011 | Tsangaris et al. ............. 48/62 R |
| 2011/0059408 | A1 | * | 3/2011 | Carroni et al. ..................... 431/9 |
| 2011/0078952 | A1 | * | 4/2011 | Tsangaris et al. ............. 48/85.1 |
| 2012/0291351 | A1 | * | 11/2012 | Bool et al. ................. 48/197 FM |
| 2012/0298020 | A1 | * | 11/2012 | Chalabi et al. ................ 110/346 |
| 2013/0087084 | A1 | * | 4/2013 | Sato et al. ..................... 110/218 |

FOREIGN PATENT DOCUMENTS

| | | |
|---|---|---|
| CA | 2255218 A1 | 6/1999 |
| CA | 2486318 A1 | 5/2005 |
| CA | 2649285 A1 | 11/2007 |
| EP | 0512305 A1 | 11/1992 |
| EP | 0801218 B1 | 10/1997 |
| EP | 0801218 B1 | 7/2001 |
| EP | 1194508 B1 | 10/2004 |
| WO | 2005113732 A1 | 12/2005 |
| WO | 2007048058 A2 | 4/2007 |
| WO | 2007136786 A1 | 11/2007 |
| WO | 2008011213 A2 | 1/2008 |
| WO | 2009155697 A1 | 12/2009 |
| WO | WO 2009155697 A1 * 12/2009 ............... B09B 3/00 |  |

OTHER PUBLICATIONS

Brandt, P. et al., "Decomposition of Tar in Gas From Updraft Gasifer by Thermal Cracking", 1st World Conference on Biomass for Energy and Industry, Sevilla, Spain Jun. 5-9, 2000, pp. 1756-1758.

* cited by examiner

CONTROL OF SYNGAS TEMPERATURE USING A BOOSTER BURNER

TECHNICAL FIELD

This application relates to apparatus and methods for fueling burners for direct-fired devices. Embodiments relate to apparatus and methods for fueling burners used for direct-firing devices such as a lime kilns using syngas produced by the gasification of carbonaceous materials.

BACKGROUND

Gasification systems for producing combustible gas (sometimes described as "synthesis gas" and hereafter referred to as "syngas") from carbonaceous materials are known, for example, as described in U.S. patent application Ser. No. 10/704,095 filed 7 Nov. 2003 (published under No. US 2004/0107638), U.S. patent application Ser. No. 11/801,030 filed 8 May 2007 (published under No. US 2007/0266914), and U.S. Pat. No. 6,120,567 issued 19 Sep. 2000, each of which is incorporated by reference herein. Syngas typically comprises $H_2$ and CO and other combustible and non-combustible materials. Carbonaceous materials suitable as feedstocks for gasification systems include biomass, coal, other fossil fuels, and the like. Non-limiting examples of biomass include: wood (in any suitable form including sawdust, shavings, pellets, chips, other wood residue and the like), municipal waste, sewage, food waste, plant matter or the like.

Syngas has numerous potential uses. Syngas may be burned in some systems designed to burn fossil fuels such as coal or natural gas without substantial modification of the systems. However, syngas typically has a lower heating value than natural gas. Therefore, the flame temperature typical of burning syngas is undesirably low for some applications.

It would be beneficial to be able to use syngas as an alternative to fossil fuels in devices requiring relatively high flame temperatures such as lime kilns. For example, for effective heat transfer in a lime kiln to promote calcination, the adiabatic flame temperature should be about 1750° C. (3180° F.) or higher.

The moisture content of carbonaceous feedstocks, such as biomass, available for gasification can vary, and affects the composition and heating value of the syngas produced. Gasification of feedstocks which have a high moisture content may produce syngas with a relatively low heating value.

Some feedstocks and gasification processes can produce syngas having a relatively high heating value. However, in such cases it is typical that the increased heating value is at least partly due to tars and other heavier fractions entrained in the syngas. Such heavier fractions tend to condense at relatively low temperatures (e.g temperatures below approximately 360° C. (680° F.)). Such condensation can be problematic, especially in situations where it is necessary to transport the syngas a significant distance from a gasifier where it is produced to a burner where it is used as a fuel.

It would be beneficial to provide apparatus and methods in which syngas combustion provides a heat source suitable for direct-firing of lime kilns or other devices requiring relatively high flame temperatures. Improved methods and apparatus for using syngas to fuel burners for direct-firing in other applications where the temperature requirement is not as high, for example for power boilers (where the burner typically operates in a range of about 1800 to about 2200° F.) or dryers would also be beneficial.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the invention provides methods for fueling a burner with syngas. The burner can be used to direct-fire a device, such as, for example, a lime kiln. In one embodiment the method comprises producing syngas in a gasifier through the gasification of a carbonaceous feedstock; providing the syngas to a syngas burner; increasing the temperature of the syngas between the gasifier and the syngas burner using a booster burner; and providing the heated syngas to the syngas burner. The carbonaceous feedstock may comprise biomass, for example. The temperature of the syngas between the gasifier and the syngas burner may be monitored using temperature sensors. The operation of the booster burner may be regulated based on feedback from the temperature sensors.

Another aspect of the invention provides systems for fueling burners with syngas. The burner can be configured to direct-fire a device, such as, for example, a lime kiln. The systems comprise a gasifier for producing syngas from a carbonaceous feedstock and a syngas burner for receiving syngas. A booster burner is disposed along the fluid path between the gasifier and the syngas burner for increasing the temperature of the syngas. The booster burner may burn a fossil fuel such as natural gas, propane or oil, for example. The carbonaceous feedstock may comprise biomass, for example. One or more temperature sensors may be provided to measure the temperature of the syngas in the fluid path. A controller may be provided to regulate the operation of the booster burner. The controller may receive feedback from the temperature sensors.

In addition to the exemplary aspects and embodiments described above, further aspects and embodiments will become apparent by reference to the drawings and by study of the following detailed descriptions.

BRIEF DESCRIPTION OF DRAWINGS

Example embodiments are illustrated in the appended drawings. The embodiments and figures disclosed herein are intended to be illustrative and not restrictive.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figure 1:
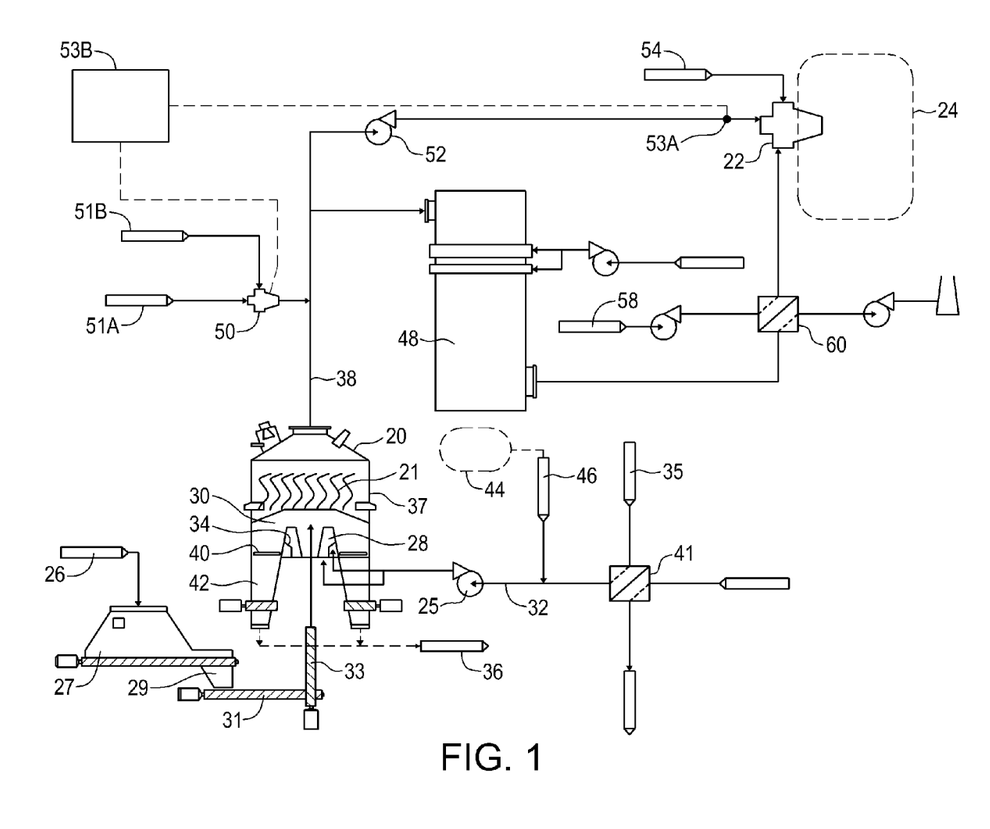
FIG. 1 is a schematic diagram of an exemplary system in which a gasifier produces syngas to fire a lime kiln.

It has now been discovered that hot syngas generated from carbonaceous materials such as biomass, coal, fossil fuels and the like in a gasifier can be used to fully or partially replace fossil fuels conventionally used to fire burners for lime kilns, or other applications which require high flame temperatures, as well as power boilers, dryers and the like. FIG. 1 illustrates schematically an example system which includes a gasification system to generate syngas as fuel to fire a lime kiln. The gasification system uses a carbonaceous material, for example biomass, as a feedstock and produces syngas.

A gasifier 20 produces syngas 21 that is fed to a syngas burner 22 of lime kiln 24. Syngas burner 22 may be a conventional burner system of the type commonly used to fire lime kilns with natural gas, for example.

In the illustrated embodiment, gasifier 20 is a fixed-bed updraft gasifier, such as that described in U.S. patent application Ser. No. 11/801,030 filed 8 May 2007 and published under No. US 2007/0266914, which is incorporated herein by reference in its entirety. Although any suitable type of gasifier may be used, the characteristics of the syngas produced by a fixed-bed updraft gasifier (i.e. its relatively high heating value and relatively low particulate content) make this type of gasifier more suited to the production of syngas to fire a lime kiln or other device requiring a relatively high flame temperature than other gasifier designs, even though some other types of gasifier may produce syngas at temperatures greater than the temperatures of syngas issuing from a fixed-bed updraft gasifier. Gasifier 20 may be bottom fed with carbonaceous material.

Carbonaceous material is fed to gasifier 20 in any suitable manner. In the illustrated embodiment, the carbonaceous material is biomass 26, which may be, for example, sized to 3 inches as the coarsest fuel. Biomass 26 may be stored in a hopper-style level-controlled metering bin 27 with a biomass outlet 29 on the lower portion thereof. Biomass may be fed from metering bin 27 to gasifier 20 via a feed assembly. In the illustrated embodiment, the feed assembly includes a generally horizontal conveyor 31 that transports biomass 26 to a generally vertical conveyor 33. Conveyors 31 and 33 may comprise screw conveyors for example. Biomass 26 is transferred by conveyor 33 into gasifier 20 via an opening the bottom of gasifier 20.

Biomass 26 is bottom-fed into the base of gasifier 20 through a fuel supply cone 28 to form a bed 30. Fuel supply cone 28 shapes bed 30 and provides passageways for the introduction of gasification oxidant 32 (e.g. air, a mixture of air and flue gas and/or steam or the like) to the biomass 26 as described below. In the illustrated embodiment, a mixture of air and steam is used as gasification oxidant 32.

Gasification oxidant 32 is supplied to gasifier 20 in any suitable manner, for example via gasification oxidant fan 25 in the illustrated embodiment. Bottom feeding of biomass 26 (i.e. as opposed to feeding from the top of the bed) creates a quiescent bed 30, which reduces carryover of particulate matter into syngas produced in the gasifier.

The moisture content of the biomass 26 being fed into gasifier 20 may, for example, be in the range of 5-60%. While low moisture content is preferable, the moisture content of biomass available for use as biomass 26 may vary significantly from season-to-season or from time to time. One feature of some embodiments is the ability to compensate for variations in the moisture content of biomass 26 through control of one or more booster burners as described below.

Inside gasifier 20, biomass in bed 30 is processed in a controlled reduced-oxygen atmosphere through progressive stages of drying, pyrolysis, gasification, and reduction to ash. Gasification oxidant 32 is introduced into the base of fuel bed 30 through nozzles 34 located in fuel supply cone 28. Hot combustion gases migrate upwardly through bed 30, drying the newly introduced biomass 26 and feeding other reactions in the gasification processes. Oxygen, carbon dioxide and water all react with carbon in a char zone of bed 30 to generate syngas, typically comprising a mixture of carbon monoxide (CO), hydrogen ($H_2$), carbon dioxide ($CO_2$), methane ($CH_4$), water ($H_2O$), and nitrogen ($N_2$). Partial oxidation and gasification typically occur at 815° C.-1000° C. (1500-1800° F.). Pyrolysis typically occurs at temperatures above 230° C. (450° F.). Through these processes, biomass 26 is converted into syngas 21 and residual ash 36. Residual ash 36 is removed from gasifier 20 by an ash-removal subsystem 42.

Syngas 21 is given off from bed 30. The refractory-lined chamber 37 of gasifier 20 may be maintained with a negative draft pressure to ensure syngas 21 remains contained. Syngas 21 is drawn toward transportation ducting 38 connected to an upper portion of gasifier 20. In the event of a shut-down, the gasification air 32 and supply of biomass 26 may be shut off to ensure that chamber 37 does not experience excessive positive pressure relative to the atmosphere outside of gasifier 20.

Residual ash 36 migrates to a grate 40 at the base of gasifier 20 where it is removed intermittently through a set of openings. The openings are normally covered by a rotating plate fabricated with corresponding openings. When activated, openings in the rotating plate become aligned with openings in the grate such that residual ash 36 can drop into ash-removal subsystem 42. Conveyors (e.g. augers) in ash-removal subsystem 42 convey the ash to an enclosed ash bin (not shown). The discharged residual ash 36, which contains negligible carbon, is typically in the range of 4-6% of the mass of the dry biomass 26 and has a high mineral content. The temperature within gasifier 20 may be maintained in a range to prevent slagging of the residual ash 36.

Through testing at a pilot-scale plant, it has been found that syngas having a higher heating value may be achieved by using steam blended with primary gasification air as an oxidant in the gasification process. The introduction of steam into the gasifier during gasification may cause one or more of the following:

A water gas shift reaction may occur as the steam passes through the hot fuel bed. This allows for higher oxygen concentration in the gasification air while still keeping the temperature within the gasifier low enough to avoid slagging of residual ash 36, thereby increasing the heating value of the syngas on a volumetric basis. The formula of the water gas reaction is given by: $C+H_2O \rightarrow CO+H_2$.

Decreased inerts ($CO_2$ and $N_2$) in the syngas.

In experimental runs, syngas produced from the gasification of dry wood fuel (having a moisture content of approximately 10%) with steam injection into the primary oxidation air as aforesaid has been found to have a heating value in excess of 200 BTU per dry standard cubic foot.

The system illustrated in FIG. 1 includes a small steam boiler 44 to provide low pressure steam 46 that is blended with air 35 to provide gasification oxidant 32. Steam boiler 44 may be fired using waste heat from flue gas produced in the operation of an oxidizer 48 or from any other suitable source of heat. Air 35 may be preheated in any suitable manner if desired, for example by way of a heat exchanger 41.

The nature and moisture-content of the feedstock supplied to gasifier 20 has an effect on the heating value and composition of syngas 21, and thus on the flame temperature produced by syngas burner 22. The feedstock supplied to gasifier 20 will therefore influence the degree to which syngas can replace fossil fuel in burner 22. In some embodiments burner 22 burns a blend of syngas and natural gas or another fuel. In some cases the blend may be controlled in response to changes in the heating value of the syngas. The use of wet feedstock for gasification typically results in syngas with a lower heating value. Syngas with a low heating value may not provide a sufficiently high flame temperature for certain applications, such as lime calcination. In such cases, syngas 21 may be supplemented with a fossil fuel in syngas burner 22 to provide a higher flame temperature. In the illustrated embodiment, switching from supplying biomass with a 10% moisture content to supplying biomass with a 50% moisture content to gasifier 20 may result in a reduction in the heating value of syngas 21 of approximately 30%.

In some embodiments, a fuel drying system may be used to dry biomass 26 prior to feeding biomass 26 to gasifier 20. Various commercial-scale fuel drying systems are available. An appropriate drying system could be selected by one skilled in the art. In some embodiments, biomass 26 is below 15% moisture content or is dried to below 15% moisture content prior to being supplied to gasifier 20.

Syngas 21 typically exits gasifier 20 at 180-480° C. (350-900° F.), with the temperature primarily depending upon the moisture content of the biomass 26. In order to maintain the temperature of syngas 21 above a desired temperature, for example about 360° C. (680° F.) to about 425° C. (800° F.) within ducting 38, a booster burner 50 is provided. Booster burner 50 is fired into the stream of syngas 21 travelling within ducting 38 so that the hot combusted fuel from booster burner 50 mixes with and is in direct contact with syngas 21. The combustion products from booster burner 50 mix with the syngas and are carried downstream with the syngas in ducting 38. Even in embodiments in which syngas 21 exits gasifier 20 at a temperature of about 315-370° C. (600-700° F.) or higher, booster burner 50 may still be used, for example, if syngas 21 must travel a significant distance to syngas burner 22. Booster burner 50 does not operate on syngas as the fuel, but is supplied with a separate fuel 51A. Separate fuel 51A preferably has a higher heating value and/or may be more easily ignited than syngas 21. In some embodiments, the fuel for booster burner 50 may be natural gas, fuel oil, or propane, for example.

Booster burner 50 is also supplied with an oxidant such as combustion air 51B. The supply of combustion air may be controlled so that booster burner 50 operates stoichiometrically or sub-stoichoimetrically (i.e. so that there is substantially no excess of combustion air 51B supplied to booster burner 50). In embodiments where booster burner 50 is operated with an approximately stoichiometric amount of oxidant, booster burner 50 may be said to provide a "neutral flame".

To regulate the amount of oxygen provided to booster burner 50, the valve regulating the rate of delivery of combustion air 51B to booster burner 50 can be linked mechanically to the valve introducing fuel 51A into booster burner 50. Alternatively, the ratio of air 51B to fuel 51A provided to booster burner 50 may be controlled electronically by a control system. If some of the fuel 51A provided to booster burner 50 is not combusted due to a deficiency of oxygen, it will mix with syngas 21 and be combusted at a later stage in the process when syngas 21 is fed to syngas burner 22.

The flow rate of fuel 51A through booster burner 50 may be calculated based on the amount of additional heat required to increase the temperature of syngas 21 downstream of booster burner 50 to the desired level. In some embodiments, the flow rate of combustion gases from booster burner 50 is approximately 1/50th of the flow rate of syngas through ducting 38.

The size of booster burner 50 is typically determined based on the degree of heating needed which depends, among other things, on the length of the ducting and anticipated moisture content of biomass 26 at a particular site. To provide an appropriate degree of heating, booster burner 50 may be operated continuously, or may be operated intermittently.

Booster burner 50 may comprise, for example, a Maxon "Ramfire"™ burner system which provides for controlled burn of natural gas. The section of ducting containing booster burner 50 is preferably refractory lined. In some embodiments, most or all of ducting 38 is refractory-lined for greater durability and to reduce loss of heat from the syngas being transported.

Booster burner 50 may be dynamically controlled to control the temperature of syngas 21 within ducting 38. In some embodiments, booster burner 50 is operated with feedback-based control in order to maintain the temperature of syngas 21 within a desired range throughout ducting 38. For example, the operation of booster burner 50 may be regulated by using a temperature sensor to maintain the syngas temperature within a desired range, e.g. 450° C.±4° C. (850° F.±25° F.) just downstream of booster burner 50. Alternatively or additionally, booster burner 50 may be controlled based on the temperature of syngas 21 exiting gasifier 20, and/or at another location such as a location that is at or close to where syngas 21 enters syngas burner 22.

A controller 53B may be provided to regulate the operation of booster burner 50. Controller 53B may receive input from one or more temperature sensors located along ducting 38. In the illustrated embodiment, a temperature sensor 53A is connected to supply a temperature signal to controller 53B which controls the operation of booster burner 50 to maintain the temperature of syngas at temperature sensor 53A above a threshold temperature.

An ultraviolet scanner or other suitable flame sensor may be used in a manner known in the art to detect the presence of a flame at booster burner 50 (and/or at syngas burner 22). Output from one or more flame sensors may be provided to a controller 53B.

Multiple temperature sensors and/or multiple booster burners 50 may be provided along ducting 38 to ensure that the temperature of syngas 21 remains above a desired minimum threshold value throughout the length of ducting 38. The temperature sensors may be linked to a control system configured to adjust the operation of booster burner(s) 50 and/or to trigger an alarm if the temperature of syngas 21 falls below a predetermined value.

The heating provided by booster burner(s) 50 helps to deliver syngas to burner 22 at a temperature sufficiently high to facilitate high flame temperatures. Booster burner(s) 50 may also reduce condensation of tars or other low-condensing materials entrained within syngas 21. Tars and other heavier hydrocarbons that may be present in syngas can have significant heating value.

Figure 2:
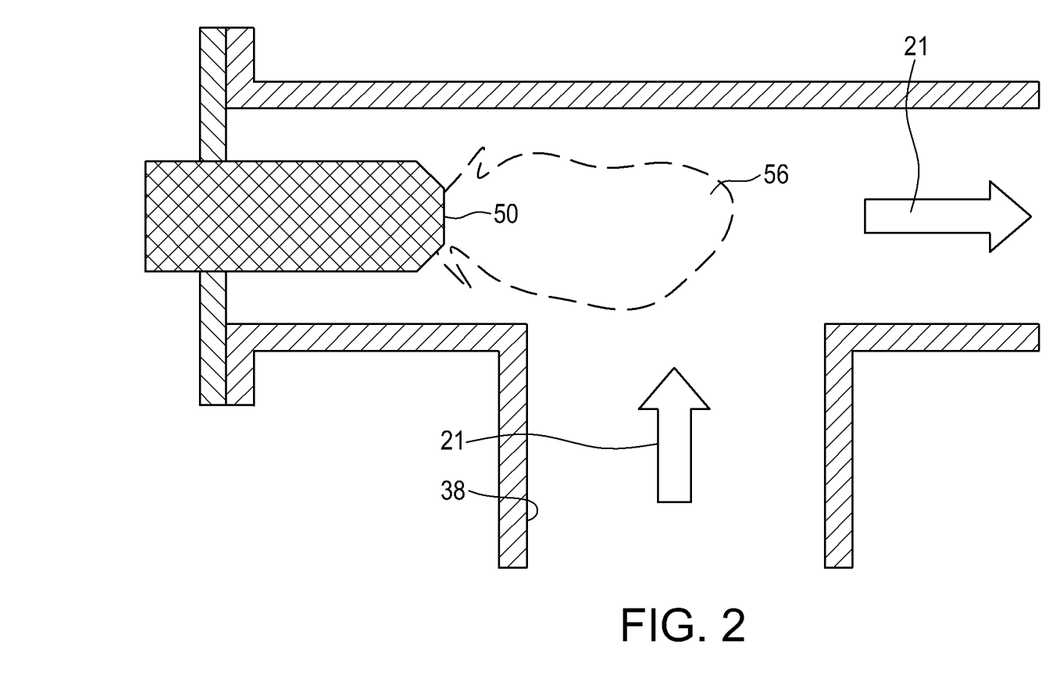
FIG. 2 shows a booster burner located within ducting carrying syngas from a gasifier to a syngas burner in one embodiment of the invention.
Figure 2A:
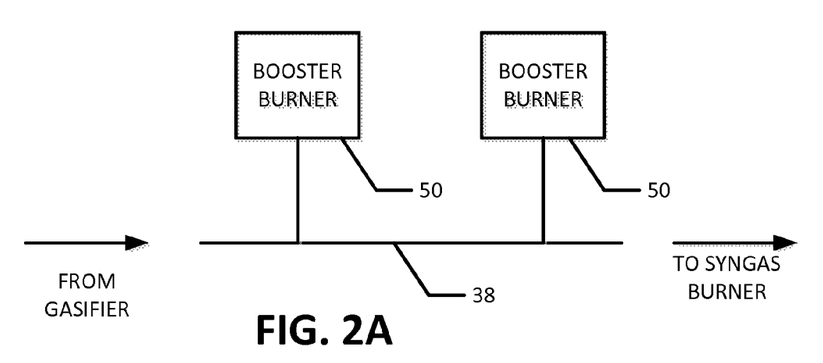
FIG. 2A shows schematically a section of ducting having a plurality of booster burners spaced apart along it.
Figure 2B:
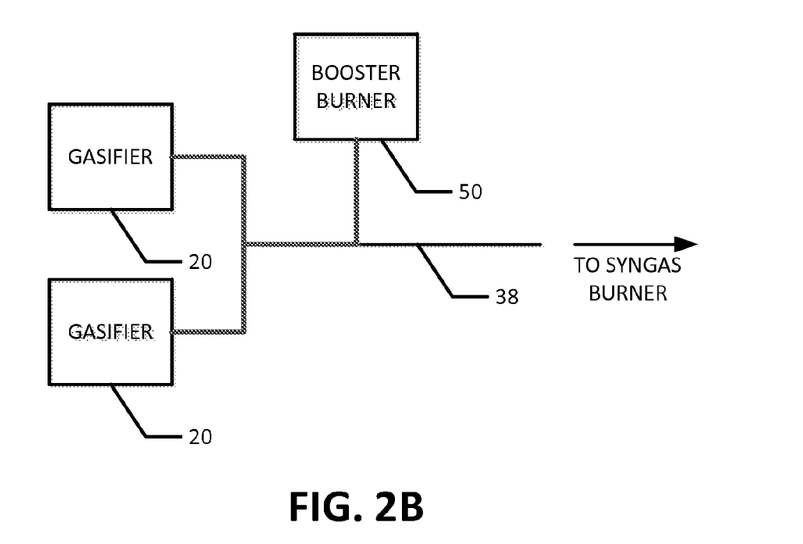
FIG. 2B shows schematically a system having two or more gasifiers which supply syngas to fuel a syngas burner.

In some embodiments, two or more gasifiers may be provided to supply syngas to fuel the same syngas burner (see e.g. FIG. 2B). In some such embodiments, the syngas output from the two or more gasifiers may be combined and fed to a common duct heated by a single booster burner upstream of the syngas burner. In some embodiments, a booster burner may be provided downstream of each gasifier to heat the syngas output from each gasifier before the syngas output from each gasifier is combined. In some embodiments, a plurality of booster burners may be provided at spaced apart locations in the ducting to maintain the temperature of the syngas at above a desired threshold value throughout the system (see e.g. FIG. 2A).

With reference to FIG. 2, booster burner 50 may be positioned so that syngas 21 is directed into booster burner flame 56 at an angle, which is 90° in the illustrated embodiment. Booster burner flame 56 is in direct contact with syngas 21. In the illustrated embodiment, booster burner 50 is set back within ducting 38 so that the stream of syngas 21 flowing along ducting 38 does not impinge directly on booster burner 50. This arrangement is optional, but helps to ensure that booster burner 50 is not fouled by tars or other deposits from the stream of syngas 21.

While the flame produced by booster burner 50 is shown in the illustrated embodiment intersecting with the stream of syngas 21 at a 90° angle, other orientations for booster burner 50 may be used. For example, syngas 21 could also be introduced into booster burner flame 56 in a tangential manner or in an annular manner (i.e. surrounding or surrounded by booster burner flame 56). Booster burner flame 56 is preferably directed into syngas 21 far enough upstream (i.e. close enough to gasifier 20) that syngas 21 does not cool to such an extent that tars contained in syngas 21 condense on the walls of ducting 38 upstream from the booster burner 50. In applications where syngas 21 must travel a significant distance to syngas burner 22, more than one booster burner 50 may be provided at spaced intervals along ducting 38 to maintain syngas 21 at least at a desired temperature (e.g. a temperature at or above about 360° C. (680° F.)) throughout the length of ducting 38.

In some embodiments, booster burner 50 is periodically operated with excess oxygen under controlled conditions to clean ducting 38. Alternatively or additionally, additional oxidant ports (not shown) may be provided at one or more locations along ducting 38 and controlled amounts of air or another oxidant may be allowed to enter ducting 38 through such ports when it is desired to clean ducting 38.

In addition to maintaining the temperature of syngas 21 above a level at which tars tend to condense within ducting 38, it is also desirable that the temperature of syngas 21 does not get too high. For example, one or more fans 52 may be provided to draw syngas 21 through ducting 38 and maintain a negative pressure within gasifier 20. However, fans 52 may be able to operate reliably only below a certain temperature (for example, some fans are designed to operate below temperatures of about 540° C. (1000° F.)). Excessively high temperatures may damage fans 52 and/or ducting 38. Larger molecules in syngas 21 may undergo cracking at higher temperatures. While this will not be overly detrimental to the firing of lime kiln 24, the tars in syngas 21 assist in maintaining a relatively high heating value of syngas 21. Accordingly, appropriate temperature sensors may also be used to trigger an action (e.g. shutdown of booster burner(s) 50, generation of a warning alarm, or the like) if the temperature of syngas 21 exceeds a temperature threshold (e.g. 510° C. (950° F.)) in ducting 38.

An oxidizer 48 may optionally be provided downstream of booster burner 50 (as shown in FIG. 1) or upstream of booster burner 50. In embodiments in which the temperature of syngas exiting gasifier 20 is relatively low (e.g. less than about 315-370° C. (600-700° F.)), oxidizer 48 is preferably located downstream of booster burner 50 to receive heated syngas 21, to reduce the tendency for fouling of valving. Alternatively, if oxidizer 48 is located upstream of booster burner 50, oxidizer 48 may be close-coupled with gasifier 20. In such embodiments, all or a portion of syngas 21 may be selectively diverted to oxidizer 48 without being heated by booster burner 50.

Oxidizer 48 may be used to combust syngas 21 at times when syngas 21 is not being directed to syngas burner 22. For example oxidizer 48 may be used to combust syngas 21 at times while syngas burner 22 is shut down or during start-up (e.g. syngas 21 may be sent to oxidizer 48 until syngas 21 is of sufficient heating value to be burned in syngas burner 22). Oxidizer 48 typically has its own burner for start-up purposes. Syngas 21 may be provided to oxidizer 48 using binary valving so that syngas 21 may be directed either to oxidizer 48 or to syngas burner 22 at a given time. In some embodiments, at least a portion of syngas 21 is continuously provided to oxidizer 48, even when syngas is also being provided to syngas burner 22, for example to keep oxidizer 48 hot.

Flue gas from oxidizer 48 may be directed to conventional heat recovery equipment such as, for example, boilers, thermal oil heaters, or air-to-air exchangers. Typically no downstream clean-up is required to vent flue gas from oxidizer 48 to atmosphere. As an alternative to being supplied to oxidizer 48, excess syngas could be burned directly in a flare stack that may be provided on the gasifier.

A second fuel source 54 is provided for syngas burner 22 so that syngas burner 22 may operate using only syngas 21, a combination of syngas 21 and second fuel 54, or only second fuel 54 to fire lime kiln 24 (or another device). In some embodiments, second fuel 54 is a fossil fuel such as natural gas, fuel oil or propane. Second fuel 54 may be used to fire lime kiln 24 during start up. Second fuel 54 may be mixed with syngas 21 in a suitable percentage to maintain a desired flame temperature of syngas burner 22 during operation. The amount of second fuel 54 required may depend on the heating value of syngas 21. Burning some of the second fuel along with syngas 21 can facilitate more responsive and accurate regulation of the flame temperature through adjusting of the supply of the second fuel 54, particularly if second fuel 54 has a significantly higher heating value than syngas 21 (e.g. as may be the case where second fuel 54 comprises natural gas). In some embodiments, syngas 21 may be used to substitute anywhere from 60% to 100% of the fossil fuel typically used in lime kiln 24.

Syngas burner 22 is connected to selectively receive both syngas 21 and second fuel 54. The ratio of syngas 21 to second fuel 54 may be controlled in any suitable manner to provide a desired flame temperature from syngas burner 22. The flame temperature may additionally or alternatively be regulated by regulating the total volume of fuel delivered to syngas burner 22. In some embodiments, a controller is provided to control the ratio of syngas 21 to second fuel 54 delivered to syngas burner 22 and/or the total volume of fuel delivered to syngas burner 22. The controller may receive feedback from a temperature sensor (not shown) that measures the flame temperature produced by syngas burner 22 and/or the temperatures at one or more points in lime kiln 24.

In some embodiments, lime kiln 24 comprises satellite coolers (not shown), which cool the discharged product from lime kiln 24 while pre-heating the secondary air that enters lime kiln 24. This high temperature secondary air may allow for a greater degree of substitution of fossil fuels by syngas 21.

In operation, syngas burner 22 (the burner for lime kiln 24) is typically ignited first using second fuel 54 (i.e. a fuel other than syngas). Accordingly, the syngas supply valve is in the closed position during startup. With syngas burner 22 operating on second fuel 54, the portion of ducting 38 between booster burner 50 and syngas burner 22 is purged, for example with air via fan 52, to remove combustibles. Booster burner 50 is lit, and the combustion stream from booster burner 50 is sent to lime kiln 24 via syngas burner 22. Once ducting 38 is sufficiently hot, the syngas supply valve is opened so that syngas 21 is sent from gasifier 20 to syngas burner 22. Depending on the heating value of syngas 21, it may be used alone to fire lime kiln 24, or it may be co-fired with one or more other fuels in syngas burner 22. In some embodiments, co-firing with another fuel, i.e. second fuel 54, may be necessary to achieve a sufficiently high temperature and to keep combustion going, i.e. for flame sustainability. Accordingly, the degree of fossil fuel substitution with syngas is variable depending on the particular operating parameters of the system, and the ratio of syngas to second fuel 54 used for syngas burner 22 may be adjusted accordingly.

The operation of syngas burner 22 to fire lime kiln 24 should generally maintain a flame temperature of at least about 1750° C. (3180° F.). Air 58 used in syngas burner 22 is preferably pre-heated, and may be pre-heated in a heat exchanger 60 using output from oxidizer 48, or using heat from another burner or oxidizer. Typically approximately 20% of the air 58 is added at the syngas burner nozzle, with the rest of air 58 being added further down the syngas burner 22 to increase the length of the flame. Syngas burner 22 is preferably operated with a stoichiometric amount of oxygen or only a slight excess of oxygen (e.g. only 1-2% $O_2$ remaining in the exhaust from syngas burner 22). Excess air may cause cooling and may reduce the output temperature and efficiency of syngas burner 22.

At start-up or when altering the flow of syngas (e.g. from oxidizer 48 to syngas burner 22 or vice versa), booster burner 50 may be operated to pre-heat the relevant portions of ducting 38 before syngas 21 is permitted to flow into that portion of ducting 38. If booster burner 50 is turned off, the flow of syngas 21 to syngas burner 22 may be shut off so that ducting 38 does not become fouled by the condensation of tar from syngas 21. Lime kiln 24 can continue to be operated using another fuel, for example second fuel 54, during such periods.

While a number of exemplary aspects and embodiments have been discussed above, those of skill in the art will recognize certain modifications, permutations, additions and sub-combinations thereof.

What is claimed is:

1. A system in which syngas is supplied as fuel for a burner used to direct-fire a device, the system comprising:
    a gasifier for producing syngas comprising tars;
    a syngas burner for receiving syngas from the gasifier by way of a fluid path;
    a booster burner disposed along the fluid path between the gasifier and the syngas burner for increasing the temperature of the syngas;
    one or more temperature sensors for measuring the temperature of the syngas in the fluid path; and
    a controller configured to regulate the operation of the booster burner based on input from the one or more temperature sensors;
    wherein the controller is configured to regulate operation of the booster burner to maintain temperatures of syngas being carried along the fluid path above a first threshold temperature that is higher than a temperature at which the tars condense and to prevent the temperatures of syngas being carried along the fluid path from exceeding a second threshold temperature that is lower than a cracking temperature of the tars.

2. A system according to claim 1, wherein the booster burner is positioned so that a flame from the booster burner contacts the syngas directly.

3. A system according to claim 1, wherein the gasifier is a fixed-bed updraft gasifier.

4. A system according to claim 3, wherein the gasifier is connected to receive biomass fuel via a fuel feed assembly.

5. A system according to claim 4, wherein the booster burner is connected to receive fuel comprising natural gas, propane, or oil from a fuel source.

6. A system according to claim 4, wherein the syngas burner is connected to selectively receive both syngas and a fossil fuel.

7. A system according to claim 3, wherein the booster burner is set back within the fluid path so that the stream of syngas travelling in the fluid path does not directly contact the booster burner.

8. A system according to claim 7, wherein the booster burner is positioned so that flame produced by the booster burner intersects with the stream of syngas at a 90° angle.

9. A system according to claim 1, wherein the syngas burner is connected to selectively receive both syngas and a fossil fuel and the controller is connected and configured to control amounts of each of the syngas and fossil fuel based on a temperature within the device direct-fired by the burner.

10. A system according to claim 9 wherein the controller is configured to increase a ratio of fossil fuel to the syngas in response to a decrease of the temperature within the device below a set temperature.

11. A system according to claim 1, wherein the booster burner is configured to use a fuel and an approximately stoichiometric amount of oxidant.

12. A system according to claim 1, wherein the booster burner is configured to use a fuel and slightly less than a stoichiometric amount of oxidant.

13. A system according to claim 1, comprising a lime kiln wherein the syngas burner is a burner of the lime kiln.

14. A system according to claim 1 comprising a power boiler or a dryer wherein the syngas burner is a burner of the power boiler or dryer.

15. A system according to claim 1, wherein the syngas burner is configured to use an approximately stoichiometric amount of oxygen.

16. A system according to claim 1, comprising an oxidizer in fluid communication with the gasifier for oxidizing at least a portion of the syngas.

17. A system according to claim 16, wherein the oxidizer is downstream of the booster burner.

18. A system according to claim 1, wherein the system comprises more than one booster burner.

19. A system according to claim 1, wherein the system comprises two or more gasifiers for producing syngas, each of the gasifiers being located upstream of the booster burner.

20. Apparatus according to claim 1 wherein the controller is configured to regulate operation of the booster burner to maintain the temperatures of syngas being carried along the fluid path to be below 540° C.

21. Apparatus according to claim 1 wherein the controller is configured to regulate operation of the booster burner to maintain the temperatures of syngas being carried along the fluid path to be below 510° C.

22. Apparatus according to claim 21 wherein the controller is configured to regulate operation of the booster burner to maintain the temperatures of syngas being carried along the fluid path to be at least 360° C.

23. Apparatus according to claim 1 comprising ducting directly connecting the gasifier and the syngas burner wherein the fluid path is contained within the ducting.

24. A method for using syngas as fuel in a burner used to direct-fire a device, the method comprising:
producing syngas comprising tars in a gasifier;
carrying the syngas from the gasifier to a syngas burner along a fluid path;
while carrying the syngas along the fluid path, increasing the temperature of the syngas using a booster burner and regulating operation of the booster burner to maintain temperatures of the syngas being carried along the fluid path above a first threshold temperature that is higher than a temperature at which the tars condense and to prevent the temperatures of the syngas being carried along the fluid path from exceeding a second threshold temperature that is lower than a cracking temperature of the tars; and
burning the heated syngas in the syngas burner.

25. A method according to claim 24, wherein flame from the booster burner contacts the syngas directly.

26. A method according to claim 24, further comprising monitoring the temperature of the syngas at a point between the gasifier and the syngas burner and adjusting the operation of the booster burner based on the temperature monitored.

27. A method according to claim 26, wherein monitoring the temperature comprises monitoring the temperature at a plurality of points between the gasifier and the syngas burner.

28. A method according to claim 26, comprising turning the booster burner off if the temperature of the syngas at the point between the gasifier and the syngas burner is greater than a predetermined value.

29. A method according to claim 28 comprising feeding biomass into the gasifier, wherein the gasifier generates the syngas from the biomass.

30. A method according to claim 28 wherein the gasifier is a fixed-bed updraft gasifier.

31. A method according to claim 24, further comprising providing a second fuel to the syngas burner in combination with the syngas.

32. A method according to claim 31, further comprising adjusting a ratio of syngas to the second fuel provided to the syngas burner to maintain a flame temperature of the syngas burner of at least about 1800° C.

33. A method according to claim 24, wherein the syngas burner is used to direct-fire a lime kiln.

34. A method according to claim 24, wherein the syngas burner is used to direct-fire a power boiler or dryer.

35. A method according to claim 24, comprising operating the booster burner using a stoichiometric amount of oxygen.

36. A method according to claim 24, further comprising providing at least a portion of the syngas from the gasifier to an oxidizer during start-up of the syngas burner.

37. A method according to claim 24, comprising supplying natural gas as the fuel for the booster burner and operating the booster burner using an approximately stoichiometric amount of oxidant.

38. A method according to claim 24, comprising supplying natural gas as the fuel for the booster burner and operating the booster burner with slightly less than a stoichiometric amount of oxidant.

39. A method according to claim 24, wherein a stream of syngas exiting the gasifier does not impinge directly on the booster burner.

40. A method according to claim 24, comprising maintaining the temperatures of the syngas being carried along the fluid path below 540° C.

41. A method according to claim 24, comprising maintaining the temperatures of the syngas being carried along the fluid path below 510° C.

42. A method according to claim 41, comprising maintaining the temperatures of the syngas being carried along the fluid path to be at least 360° C.

43. A method according to claim 24 comprising delivering the tars to the syngas burner.

* * * * *